Patented Feb. 13, 1951

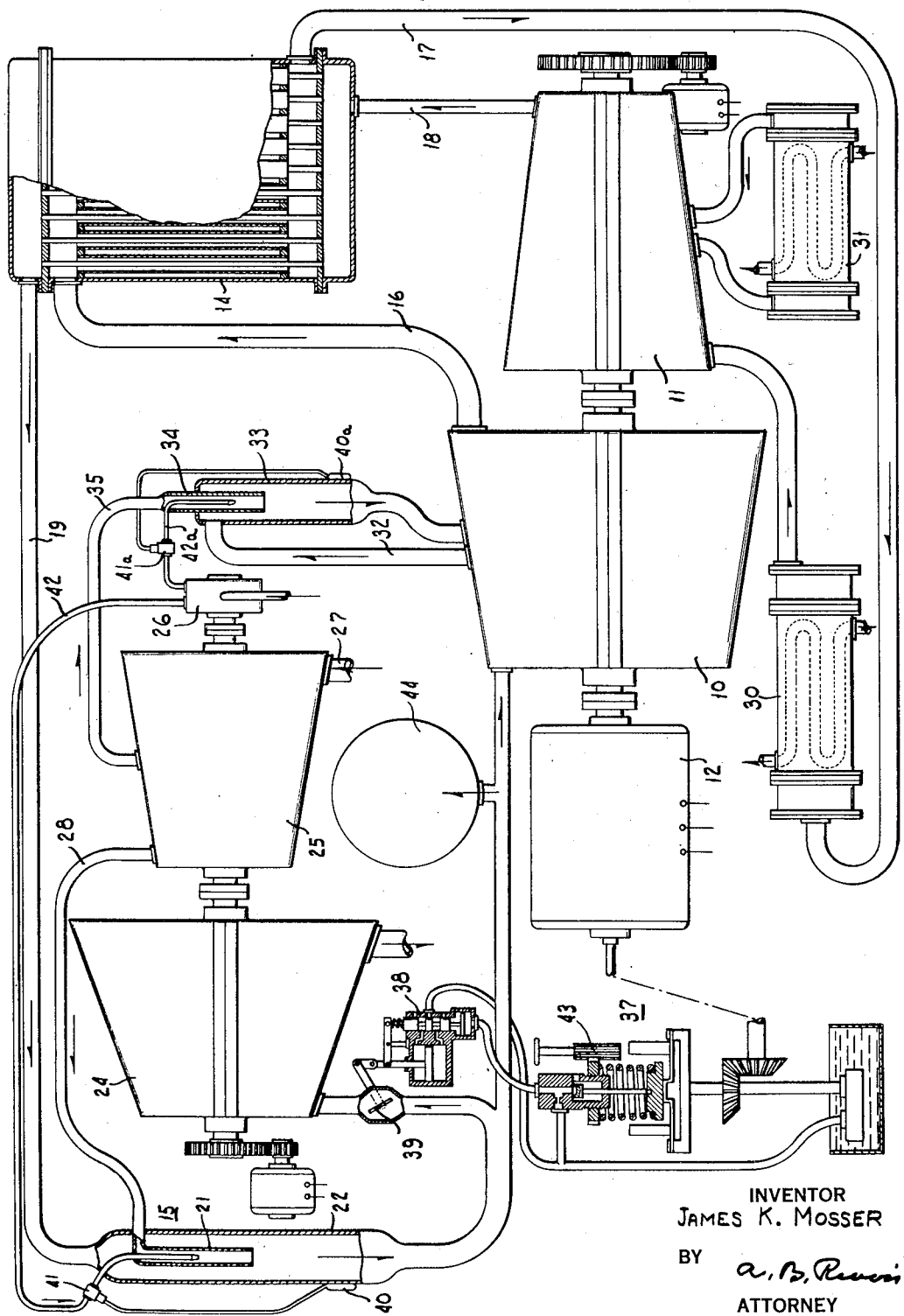

2,541,532

UNITED STATES PATENT OFFICE 2,541,532

GAS TURBINE POWER PLANT

James K. Mosser, Newton, Iowa, assignor to Westinghouse Electric Corporation, East Pittsburgh, Pa., a corporation of Pennsylvania Application April 29, 1947, Serial No. 744,593

1 Claim. (Cl. 60—41)

In the patent to New, No. 2,303,381, granted December 1, 1942, there is disclosed and claimed an internally-fired closed cycle type of gas turbine power plant. The present invention has for an object to provide improved means for controlling a plant of that character.

A more particular object of the invention is to provide, with a plant of the above character, a governor responsive to speed of the main turbine to control the heat input to the latter.

A further object of the invention is to provide, with a plant of the above character, a governor responsive to speed of the main turbine for controlling the input of heated working fluid to the auxiliary turbine and a thermostat responsive to temperature of working fluid between the combustor and the main turbine inlet for controlling the input of fuel to the combustor.

These and other objects are effected by the invention as will be apparent from the following description and claim taken in connection with the accompanying drawing, forming a part of this application, in which:

The figure is a diagrammatic view of a plant equipped with the improved controlling means.

In the drawing, there is shown a main turbine 10 driving a main compressor 11 and an electric generator 12, a regenerator 14, and a combustor, at 15. The conduits 16, 17, 18 and 19 connect the turbine, the regenerator, the compressor, and the combustor in a working fluid circuit.

The regenerator 14 is connected in the circuit, by means of the conduits 16 and 17, between the turbine outlet and the compressor inlet, and, by the conduits 18 and 19, between the compressor outlet and the combustor, at 15. This arrangement of regenerator provides for transfer of heat from working fluid exhausting from the turbine to working fluid supplied from the compressor to the combustor.

The combustor, at 15, is shown, for example, as being comprised by a burner tube 21 housed within a portion 22 of the conduit 19 of enlarged section, and the burner tube is supplied with fuel and air by the means to be described, such tube discharging hot products of combustion into the working fluid circuit between the regenerator and the main turbine inlet.

Heated working medium is tapped from the conduit 19 between the combustor and the main turbine inlet and supplied to the inlet of the auxiliary turbine 24 exhausting to the atmosphere. The auxiliary turbine drives an auxiliary compressor 25 and a fuel pump 26. The auxiliary compressor 25 has its inlet 27 open to the atmosphere and it has its outlet connected by the conduit 28 to the burner tube 21.

Preferably, as shown, the main compressor 11 has associated therewith the precooler 30 and the interstage cooler 31. Also, it may be desirable to provide the main turbine 10 with an interstage reheater. Accordingly, such turbine is shown as being provided with a looped passage 32 having a portion 33 of enlarged flow area housing a burner tube 34 supplied with air by the conduit 35 from a suitable stage of the auxiliary compressor 25 and supplied with fuel from the fuel pump. As before, the burner tube discharges hot products of combustion into the working fluid circuit.

The main turbine 10 drives a governor, at 37, which operates, through a servo-motor 38, to control the valve 39 to vary the input of heated working fluid to the auxiliary turbine, in consequence of which the auxiliary compressor is operated to vary the input of air to the burner tube 21 and to the burner tube 34, if interstage reheating is used. The input of fuel to the burner tube or tubes is controlled in relation to the air to maintain a satisfactorily high temperature of heated working fluid, the latter result being accomplished, for example, by the thermostat 40 controlling a valve 41 in the fuel line 42. Similarly, where interstage reheating is employed, a thermostat 40a controls a valve 41a in the fuel line 42a for the burner tube 34. The governor has a suitable speed changer 43.

The plant, illustrated and described, operates as follows: As the speed changer 43 is adjusted to increase the load carried by the connected electric generator and main turbine, the governor operates, through the servo-motor 38, to open the valve 39 wider, whereupon the division of motive fluid for the auxiliary and main turbines is changed—the supply for the auxiliary turbine increasing and that for the main turbine decreasing. Consequent impairment of power developed by the main unit is temporary for the reason that the increased auxiliary turbine power results in increase in speed of the auxiliary turbine and both the fuel pump 26 and the auxiliary compressor 25 driven thereby, to increase the quantity of fuel and flow of air to the combustors, and this will continue until the motive fluid supplied to the main turbine is sufficient to carry the increase in load, the main turbine, as it carries more load, operating, through the governor, to readjust the valve 38 until the auxiliary power suffices to generate motive fluid adequate therefor as well as to develop the main turbine power required for the increased load. To decrease the main unit load, the speed changer is adjusted in the opposite direction.

Thus, as the load is changed, the auxiliary turbine is operated through a speed range with the main turbine speed maintained substantially constant, particularly as it is connected to a synchronous electrical system, the auxiliary unit operating at minimum speed for the minimum main turbine load and at the maximum speed for maximum main unit load. While the valve 38 restricts flow to the auxiliary unit to a maximum extent at the low main unit load condition and to the minimum extent at the high load condition, it is to be understood that such valve has a variable condition of operation during the time required to change the main unit load, the adjustment of the speed changer immediately resulting in movement of the valve 38. While the consequent temporary change in main turbine supply tends to move the valve 38 farther in the same direction, just as soon as the valve 38 starts to move, a compensating process begins, the change in motive fluid generation pursuant to change in auxiliary power causing change in main unit power until the latter carries the load corresponding to speed changer setting, the governor operating to readjust the valve 38 until the auxiliary and main unit load requirements are satisfied.

The motive fluid line to the main turbine may have a storage reservoir 44 communicating therewith to narrow pressure fluctuations at the main turbine inlet and give increased stability to the system.

While the invention has been shown in but one form, it will be obvious to those skilled in the art that it is not so limited, but is susceptible of various changes and modifications without departing from the spirit thereof.

What is claimed is:

In a gas turbine power plant, a main turbine driving an external load; a main compressor driven by the turbine; a regenerator; a combustor; means for connecting the main turbine, the regenerator, the main compressor, and the combustor in a working fluid circuit with the regenerator arranged to transfer heat from the stream of working fluid flowing from the turbine exhaust outlet to the compressor inlet to the stream of working fluid flowing from the compressor outlet to the turbine inlet and with the combustor arranged to inject hot combustion gaseous products into the stream of working fluid between the regenerator and the turbine inlet; an auxiliary turbine supplied with heated working fluid tapped from said circuit between the combustor and the main turbine inlet and exhausting to the atmosphere; an auxiliary compressor driven by the auxiliary turbine for supplying air from the atmosphere to the combustor; a fuel pump driven by the auxiliary turbine for supplying liquid fuel to the combustor; a governor responsive to speed of the main turbine for controlling the input to the auxiliary turbine of working fluid tapped from the circuit; and a thermostat responsive to temperature of working fluid between the compressor and the main turbine inlet to control the input of fuel to the combustor.

JAMES K. MOSSER.

REFERENCES CITED

The following references are of record in the file of this patent:

UNITED STATES PATENTS

| Number | Name | Date |
|---|---|---|
| 1,766,548 | Schnitzer | June 24, 1930 |
| 1,873,982 | Rusterholz | Aug. 30, 1932 |
| 1,978,837 | Forsling | Oct. 30, 1934 |
| 2,219,994 | Jung | Oct. 29, 1940 |
| 2,263,705 | Seippel | Nov. 25, 1941 |
| 2,280,765 | Anxionnaz et al. | Apr. 21, 1942 |
| 2,303,381 | New | Dec. 1, 1942 |
| 2,318,905 | Traupel | May 11, 1943 |
| 2,336,232 | Doran | Dec. 7, 1943 |
| 2,371,889 | Hermitte | Mar. 30, 1945 |